(12) United States Patent
Ramakrishnan

(10) Patent No.: US 9,001,948 B2
(45) Date of Patent: Apr. 7, 2015

(54) PULSE SHAPING IN A COMMUNICATION SYSTEM

(75) Inventor: Sthanunathan Ramakrishnan, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 476 days.

(21) Appl. No.: 12/977,094

(22) Filed: Dec. 23, 2010

(65) Prior Publication Data

US 2012/0163489 A1    Jun. 28, 2012

(51) Int. Cl.
| | | |
|---|---|---|
| *H04L 27/18* | (2006.01) | |
| *H04L 27/22* | (2006.01) | |
| *H04L 27/00* | (2006.01) | |
| *H04L 27/06* | (2006.01) | |
| *H04L 27/04* | (2006.01) | |
| *H04L 27/20* | (2006.01) | |
| *H04L 25/03* | (2006.01) | |
| *H04L 27/34* | (2006.01) | |

(52) U.S. Cl.
CPC ...... *H04L 25/03834* (2013.01); *H04L 27/2017* (2013.01); *H04L 27/3411* (2013.01)

(58) Field of Classification Search
CPC ............... H04L 25/03828; H04L 25/03834; H04L 27/3411; H04L 25/061; H04B 1/7172
USPC ........................... 375/295, 316, 350, 279, 308
See application file for complete search history.

(56) References Cited

U.S. PATENT DOCUMENTS

| | | | | |
|---|---|---|---|---|
| 2002/0075076 | A1* | 6/2002 | Sowlati ....................... | 330/296 |
| 2007/0081604 | A1* | 4/2007 | Khan et al. ................... | 375/261 |
| 2007/0218942 | A1* | 9/2007 | Khan et al. ................ | 455/553.1 |
| 2007/0230593 | A1* | 10/2007 | Eliaz et al. .................... | 375/260 |
| 2008/0080627 | A1* | 4/2008 | Korhonen et al. ............ | 375/260 |
| 2008/0118002 | A1* | 5/2008 | Fonseka et al. ............... | 375/298 |
| 2008/0187072 | A1* | 8/2008 | Schell et al. .................. | 375/296 |
| 2010/0165829 | A1* | 7/2010 | Narasimha et al. ........... | 370/210 |

OTHER PUBLICATIONS

Steredenn Daumont, Basel Rihawi and Yves Lout, "Root-Raised Cosine filter influences on PAPR distribution of single carrier signals", IETR / SUPELEC, France, IEEE, Mar. 2008.*

(Continued)

*Primary Examiner* — Aristocratis Fotakis
(74) *Attorney, Agent, or Firm* — Alan A. R. Cooper; Frank D. Cimino

(57) ABSTRACT

A transmitter used in a communication system includes a raised cosine filter for transmit pulse shaping. A receiver in the communication system, designed to receive and demodulate transmissions from the transmitter, includes a root-raised cosine filter for receive pulse shaping. The use of a raised cosine filter in the transmitter enables reduction of peak-to-average ratio (PAR) of the output of a power amplifier used in the transmitter, enabling the power amplifier to be implemented to have relatively higher power efficiency than otherwise. In an embodiment, the transmitter and receiver employ π/2-shift binary phase-shift keying (π/2 BPSK), and the raised cosine filter in the transmitter is implemented to have a roll-off factor of 0.5 and a total length of four symbol periods. In an embodiment, the root-raised cosine filter is implemented to have a roll-of factor of 0.2 and a length of four symbol periods.

14 Claims, 4 Drawing Sheets

(56) References Cited

OTHER PUBLICATIONS

Ye Li, Bertan Bakkaloglu and Chaitali Chakrabarti, "A System Level Energy Model and Energy-Quality Evaluation for Integrated Transceiver Front-Ends", Arizona State University, IEEE, Jan. 2007.*

"R. Funada, M.A Rahman, C.S Sum, T. Baykas, J. Wang, H. Harada, M. Umehira, S. Kato and I. Lakkis", Proposed Text on $\pi/2$ BPSK and (G) MSK description, IEEE 802.15-08/0674-02-003c, Year Sep. 11, 2008, pp. 1-3.

"Ken Gentile", The care and feeding of digital, pulse-shaping filters, published by RF Design, http://www.filter-solutions.com/raised.html, Year Apr. 2002, pp. 50-61 and 1-6.

"Inter Symbol Interference (ISI) and raised cosine filtering", www.complextoreal.com, Copyright 2002 Charan Langton, pp. 1-23.

"Equations for the Raised Cosine and Square Root Raised Cosine Shapes", Purdue Engineering, in EE 538, Fall 2013, offered by Mike Zoltowski, professor.

* cited by examiner

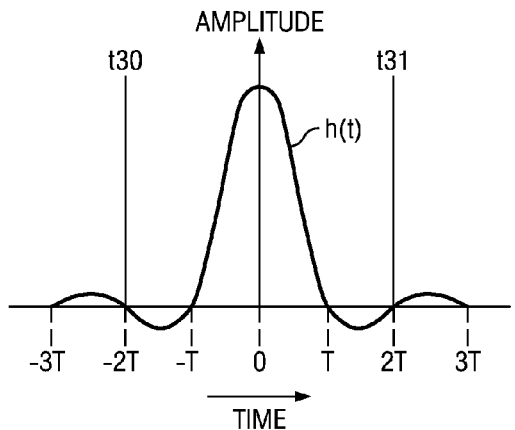
FIG. 3A
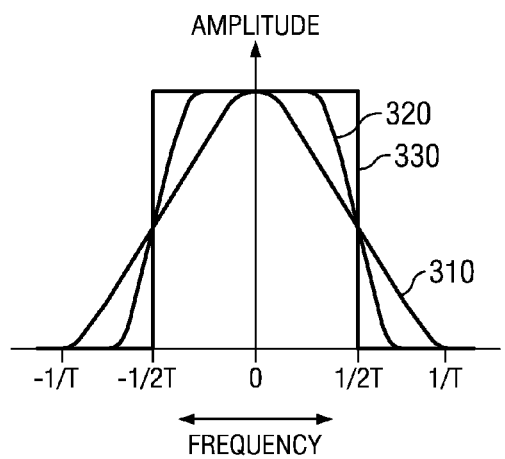
FIG. 3B
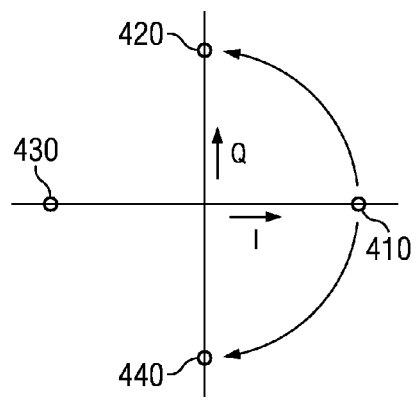
FIG. 4
| FILTER LENGTH OF RAISED COSINE FILTER | PAR (dB) | EMISSIONS IN ADJACENT CHANNEL (dB) |
|---|---|---|
| 1 | .67 | -22 |
| 2 | .76 | -36.2 |
| 3 | .95 | -47.6 |
FIG. 5

PULSE SHAPING IN A COMMUNICATION SYSTEM

BACKGROUND

1. Technical Field

Embodiments of the present disclosure relate generally to communication circuits, and more specifically to pulse shaping in a communication system.

2. Related Art

Communication systems are well-known in the relevant arts, and generally include one or more transmitters and one or more receivers. The transmitters and receivers may communicate with each other using corresponding modulation techniques (digital and/or analog) and protocols. The modulation techniques include those in which information is represented as changes in one or more of the amplitude, frequency and phase of a carrier signal used in a transmitter, as is also well-known in the relevant arts. Some examples of modulation techniques used in communication systems include frequency-shift keying (FSK), phase-shift keying (PSK), quadrature-amplitude modulation (QAM), etc.

Pulse shaping generally refers to a technique by which the shape of a signal (e.g., binary pulse or a baseband signal) to be transmitted is modified (or filtered) prior to transmission. Pulse shaping may be used in a communication system for reasons such as to limit the bandwidth of a signal to fit within a channel bandwidth allocated or available for use by the signal, to mitigate the undesirable effects of inter-symbol interference due to finite bandwidth of the communication channel used (wireless or wireline), etc. Pulse shaping may also be used in a receiver, in conjunction with pulse shaping in a corresponding transmitter, to enable matched filtering of a received signal to minimize, or reduce to zero, noise due to inter-symbol interference (ISI).

The specific pulse shapes (or pulse shaping filters) that may be used in a transmitter and receiver of a communication system may be selected based on considerations such as, for example, ease of implementation, the desired level of reduction in ISI, etc.

SUMMARY

This Summary is provided to comply with 37 C.F.R. §1.73, requiring a summary of the invention briefly indicating the nature and substance of the invention. It is submitted with the understanding that it will not be used to interpret or limit the scope or meaning of the claims.

A transmitter includes a constellation mapper, a transmit pulse shaper and a power amplifier. The constellation mapper is coupled to receive a plurality of data sets, and to generate corresponding symbol values representing each data set in the plurality of data sets. The transmit pulse shaping filter is coupled to receive and to filter the symbol values to generate corresponding pulse-shaped values, and is implemented as a raised cosine pulse filter. The power amplifier is coupled to receive and to amplify the pulse-shaped signals to generate an amplified signal. The amplified signal is coupled to be transmitted on a communications channel.

Several embodiments of the present disclosure are described below with reference to examples for illustration. It should be understood that numerous specific details, relationships, and methods are set forth to provide a full understanding of the embodiments. One skilled in the relevant art, however, will readily recognize that the techniques can be practiced without one or more of the specific details, or with other methods, etc.

BRIEF DESCRIPTION OF THE VIEWS OF DRAWINGS

FIG. 3A is a diagram showing the impulse response of a transmit pulse shaping filter for an example value of a roll-off factor, in an embodiment.

FIG. 3B is a diagram showing the frequency spectrum of a transmit pulse shaping filter for examples values of a roll-off factor.

FIG. 4 is a constellation diagram showing symbol values used by a transmitter, in an embodiment.

FIG. 5 is a diagram showing a table with entries representing example PAR values of an output of a power amplifier for corresponding values of pulse shaping filter length and emissions in adjacent channels, in an embodiment.

The drawing in which an element first appears is indicated by the leftmost digit(s) in the corresponding reference number.

DETAILED DESCRIPTION

Various embodiments are described below with several examples for illustration.

1. Example Environment

Figure 1:
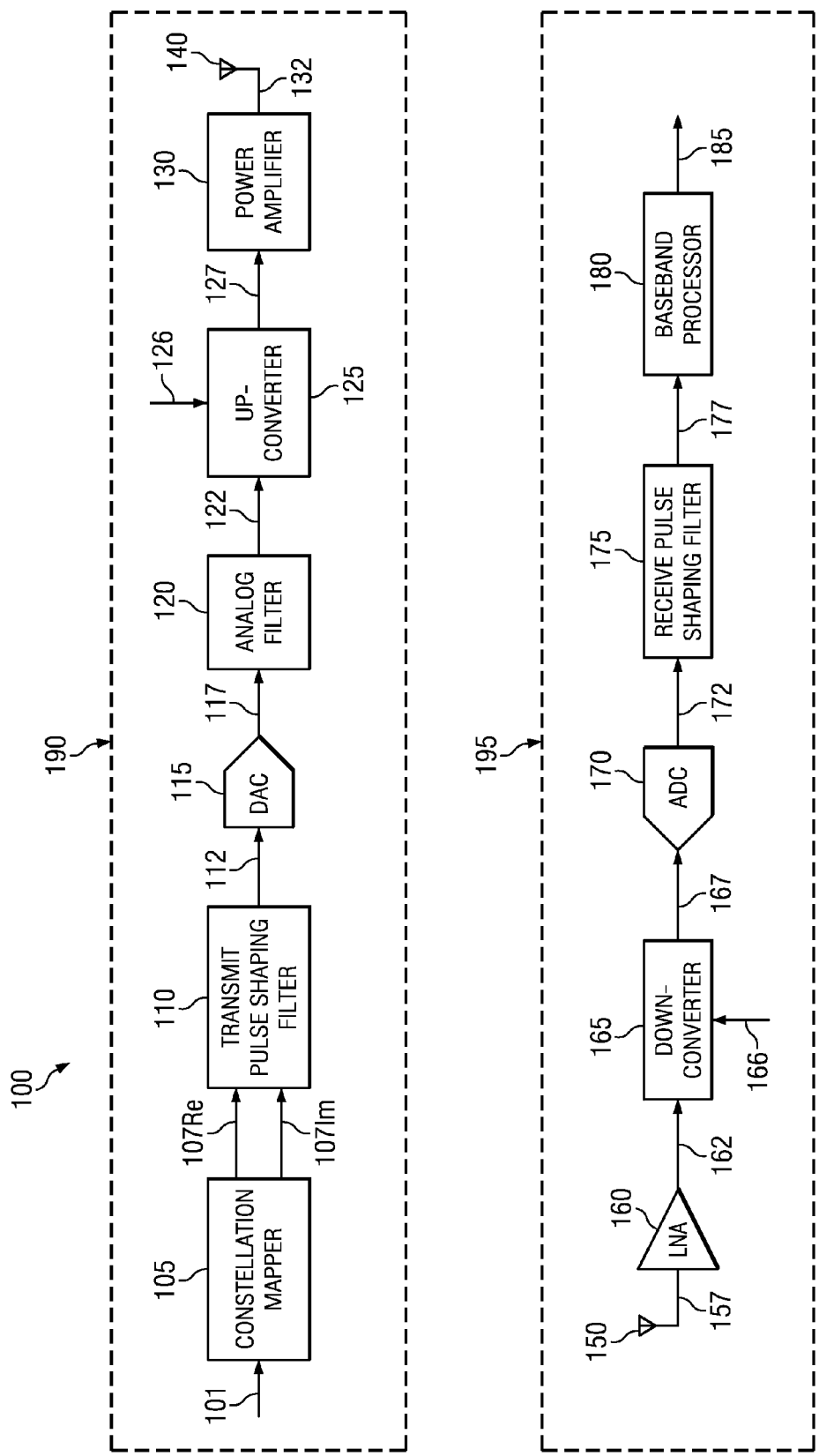
FIG. 1 is a block diagram of an example environment in which several embodiments can be implemented.

FIG. 1 is a block diagram illustrating an example environment in which several embodiments can be implemented. The diagram shows a communication system 100. Communication system 100 is shown containing transmitter 190 and receiver 195. Transmitter 190 and receiver 195 may be located in physically separate locations. In the description below, it is assumed that transmitter 190 uses phase-shift keying (PSK) as the modulation technique, and receiver 195 uses corresponding demodulation techniques. However, in other embodiments, other modulation techniques, including QAM, can also be used.

Transmitter 190 is shown containing constellation mapper 105, transmit pulse shaping filter 110, digital to analog converter (DAC) 115, analog filter 120, up-converter 125, power amplifier 130 and antenna 140.

Constellation mapper 105 receives binary data on path 101. The binary data on path 101 represent information sought to be transmitted by transmitter 190, and may be generated by a processor or a host device, not shown. However, such a processor or host device may also be contained within transmitter 190. Constellation mapper 105 selects groups (plurality of data sets) of successive bits from the binary data received on path 101, and assigns a symbol value according to a desired type of PSK to each group, i.e., the mapping between a data set and the corresponding symbol value is according to PSK modulation. The size of each group, i.e., the number of bits in each group of successive bits, depends on the specific type of PSK used in transmitter 190 (and communication system 100 in general). For example, if binary phase shift keying (BPSK) is used, the size equals one bit. If quadrature phase shift keying (QPSK) is used, the size equals two bits. For other types of PSK such as quadrature amplitude modulation (QAM), the size may be correspondingly different. The operation performed by constellation mapper 105 in selecting symbol values corresponding to each group of successive data bits represents a digital modulation operation.

Symbol values selected by constellation mapper 105 may, in general, be represented mathematically by complex numbers. Constellation mapper 105 forwards the 'real' component of a complex number representing a symbol value on path 107Re, and the 'imaginary' component of the complex number representing the symbol value on path on path 107Im.

Transmit pulse shaping filter 110 receives, on respective paths 107Re and 107Im, the real and imaginary components of each complex value generated by constellation mapper 105. Transmit pulse shaping filter 110 filters each of the values received on path 107Re and 107Im according to a desired pulse shape. The desired pulse shape may be designed to satisfy one or more requirements. The requirements may include reduction of the bandwidth occupied by a signal transmitted by transmitted 190, minimization of ISI in a receiver that receives and decodes the transmissions of transmitter 190, reduction in the peak-to-average ratio (PAR) of the output of power amplifier 130 for transmitting signals, etc. In an embodiment, transmit pulse shaping filter 110 is implemented as a finite impulse response (FIR) filter whose impulse response (values of filter coefficients) is the desired pulse shape. Thus, transmit pulse shaping filter 110 filters each of the values received on paths 107Re and 107Im to generate corresponding pairs of 'pulse-shaped' digital signals. Transmit pulse shaping filter 110 forwards each pair of pulse-shaped digital signals on path 112.

DAC 115 receives each of the pairs of pulse-shaped digital signals on path 112, and generates, on path 117, corresponding analog signals (in the form of voltage or current) representing the digital values. Thus, DAC 115 generates, in each symbol duration, analog representations of the real and imaginary components of the complex symbol value generated by constellation mapper 105. DAC 115 forwards the analog signals on path 117.

Analog filter 120 operates as a reconstruction filter, and performs low-pass filtering of the analog signals forwarded on path 117 by DAC 115, to generate corresponding filtered analog signals with frequency components restricted to lie within a desired bandwidth. Thus, analog filter 120 filters the analog representations of the real and imaginary components of each symbol value generated by constellation mapper 105. Analog filter 120 provides the low-pass filtered analog signals on path 122.

In FIG. 1, each of paths 112, 117 and 122 is shown as a single path. However, the paths may contain a pair of paths each, one for transmission of the real component of the output signal of the corresponding previous stage or block, and the other for transmission of the imaginary component of the output signal of the corresponding previous stage. Further, while only one instance of each of transmit pulse shaping filter 110, DAC 115, and analog filter 120 is shown in FIG. 1, in other embodiments, separate transmit pulse shaping filters, DACs and analog filters may be used to process the signals corresponding to the real component and the imaginary component separately.

Up-converter 125 receives a local oscillator (LO) signal on path 126, and generates a ninety-degree phase-shifted LO signal internally. The pair of LO signals, thus obtained represent sine and cosine LO signals. Alternatively, up-converter 125 may directly receive the sine and cosine LO signals. The LO signal on path 166 may be generated by an oscillator, not shown, but contained in receiver 195. Up-converter 125 mixes (multiplies) the real component received on path 122 with the cosine LO signal, and the imaginary component received on path 122 with the sine LO signal. Up-converter 125 combines, by addition, the respective products of the mixing operations noted above. The sum, thus, obtained, represents an up-converted signal. The products of the mixing operation may be filtered by a filter (not shown, but assumed to be contained within up-converter 125) to remove undesired products generated by the mixing operation, and to provide, on path 127, only the desired frequency band of the up-converted signal. In effect, up-converter 125 increases the carrier frequency of the signal received on path 122 to a value in a desired (or usable/allowed) transmit frequency band, and the signal on path 127 may be viewed as an up-converted transmit signal.

Power amplifier 130 amplifies the up-converted transmit signal received on path 127, and generates a power-amplified signal (amplified signal) on path 132. Antenna 140 transmits the amplified signal on a wireless medium.

Constellation mapper 105, DAC 115, analog filter 120, up-converter 125, power amplifier 130 and antenna 140 may be implemented in a known way.

Receiver 195 is shown containing antenna 150, low-noise amplifier (LNA) 160, down-converter 165, analog to digital converter (ADC) 170, receive pulse shaping filter 175, and baseband processor 180.

Antenna 150 receives a PSK modulated signal from a wireless medium, and provides the signal to LNA 160 via path 157. The signal received by antenna 150 may correspond, for example, to the signal transmitted by antenna 140 of transmitter 190. While transmitter 190 and receiver 195 are described as communicating over a wireless medium, in other embodiments a wireline medium may instead be used. The medium over which signals are transmitted by transmitter 190 (and received by receiver 195) is referred to herein as a communication medium, and includes both wired and wireless transmission paths.

LNA 160 amplifies the signal received on path 157 with minimal addition of noise, and provides an amplified signal on path 162. Down-converter 165 mixes signal 162 with a local oscillator signal received on path 166 to generate a down-converted signal at a lower carrier frequency. The products of mixing generated in down-converter 165 may be low-pass filtered by one or more filters contained in down-converter 165 to remove undesired sidebands of mixing. Down-converter 165 provides the down-converted signal on path 167. In an embodiment, down-converter 165 employs IQ demodulation. Accordingly, down-converter 165 mixes signal 162 with sine and cosine local oscillator (LO) signals to generate in-phase (I) and quadrature phase (Q) products, as is well-known in the relevant arts. The I and Q products are low-pass filtered, and each of the low-pass filtered products is provided to ADC 170 via corresponding paths assumed to be contained in path 167.

ADC 170 converts the filtered I and Q products received on path 167 to corresponding digital codes. ADC 170 provides the digital codes on path 172. Receive pulse shaping filter 175 filters the digital codes corresponding to the I and Q signal components received on path 172 according to a desired pulse shape. In an embodiment, receive pulse shaping filter 175 is implemented as an FIR filter. The specific implementation of receive pulse shaping filter 175 may be designed to minimize ISI (in conjunction with operation of a transmit pulse shaping filter in a corresponding transmitter), as is well-known in the relevant arts. Receive pulse shaping filter 175 provides the pulse-shaped I and Q signal components on path 177. The pulse-shaped I and Q components represent a baseband signal. While only one instance of each of ADC 170, and receive pulse shaping filter 175 is shown in FIG. 1, in other embodiments, separate ADCs and receive pulse shaping filters may be used to process the I and Q signals separate. Correspondingly, paths 167, 172 and 177 may each represent a pair of paths, one for the I signal component, and the other for the Q signal component.

Baseband processor 180 samples the I and Q signal components received on path 177 at appropriate sampling instances (which typically correspond to instances at which the SNR (signal-to-noise ratio) of the sampled signal is a maximum). Baseband processor 180 extracts, by demodulation, the data or symbol values contained in signal 177. Baseband processor 180 may either operate on the data thus extracted to provide desired features, or forward the data on path 185 to a processing device (not shown). LNA 160, downconverter 165, ADC 170 and baseband processor 180 may be implemented in a known way.

Typically, transmit pulse shaping filter 110 is implemented as a root raised cosine filter (RRC filter, also known as square-root raised cosine filter), with a desired roll-off factor and length. Complementarily, receive pulse shaping filter 175 is also implemented as a RRC filter. As is well-known in the relevant arts, the combination of a RRC filter implemented as transmit pulse shaping filter 110 in transmitter 190, and a RRC filter implemented as receive pulse shaping filter in receiver 195 enables communicating system 100 (and receiver 195 in particular) to operate with matched filtering. As is also well-known in the relevant arts, such matched filtering enables optimal operation of communication system 100 (enabling a correct determination in receiver 195 of data transported in a transmitted signal) in the presence of noise in the wireless medium (communication channel).

However, one drawback with implementing transmit pulse shaping filter 110 may be that the peak-to-average ratio (PAR, also known as crest factor or peak-to-average power ratio) of output 132 of power amplifier 130 may be unacceptably high, as illustrated with respect to the example waveform of FIG. 2. As is well-known in the relevant arts, PAR a waveform (signal) is the ratio of the peak value of the waveform to the root-mean-squared (rms) value of the waveform.

Figures 2A, 2B:
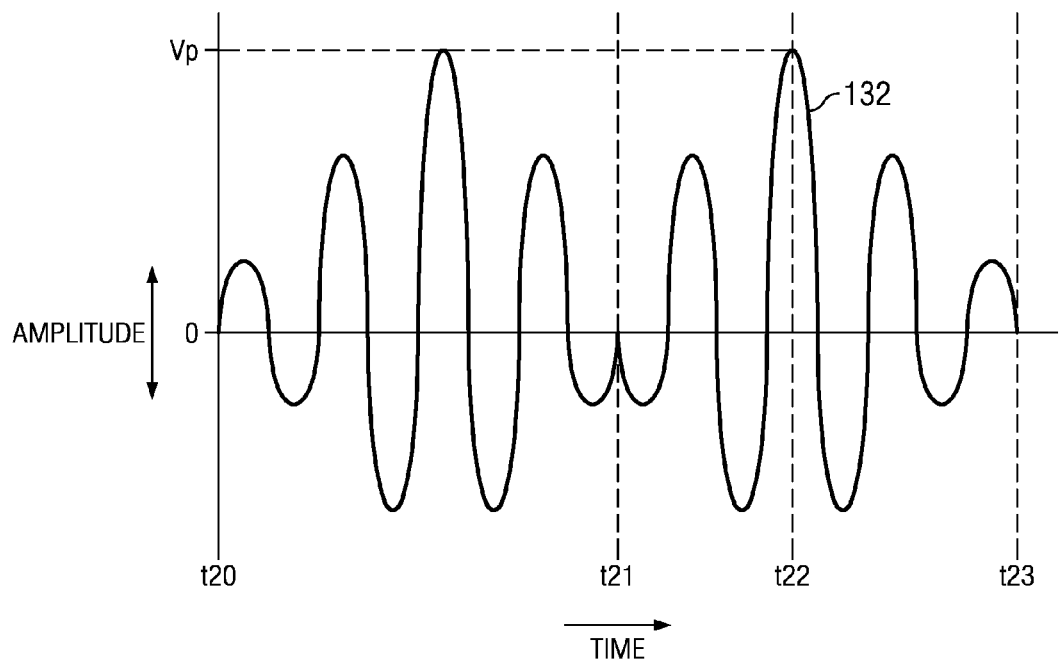
FIG. 2A is a diagram illustrating an example waveform of an output of a power amplifier in a transmitter, according to a prior approach.
FIG. 2B is a diagram showing a table with entries representing example PAR values of an output of a power amplifier for corresponding values of pulse shaping filter length and emissions in adjacent channels, according to a prior approach.

FIG. 2A shows an example waveform representing signal 132 of FIG. 1. The waveform of FIG. 2A is shown merely to illustrate PAR variations of signal 132, and may not correspond precisely to a real-world signal. Two symbol durations, t20-t21 and t21-t23, of signal 132 are shown in FIG. 2. Assuming BPSK modulation is used in transmitter 190, signal 132 represents one binary logic level in interval t20-t21, and the complementary logic level in interval t21-t23. Voltage Vp represents the peak amplitude of signal 132. It may be observed from FIG. 2A, that the amplitude of signal 132 varies substantially. To illustrate, the amplitude at t22 is much greater than the amplitude at t21. In general, the PAR of signal 132 may be higher than a desired level when RRC pulse shaping is used in transmit pulse shaping filter 110.

Table 250 of FIG. 2B shows example PAR values of signal 132 for corresponding values of filter length (of transmit pulse shaping filter 110 implemented as a RRC filter with roll-off factor of 0.5) and emissions in adjacent channels, in an embodiment of transmitter 190 designed to employ π/2-shift BPS K. PAR corresponding to adjacent channel emission of −40.6 dB equals 2.1 dB (deciBels), which may be unacceptably high, at least from the perspective of efficiency of power amplifier 130.

A need to support a high PAR value of signal 132 may require that power amplifier 130 be implemented to have adequately linear amplification (or gain) characteristics, which in turn may translate to lower power efficiency of power amplifier 130. Such lower power efficiency may be unacceptable at least in some deployment environments. For example, when transmitter 190 is part of a medical implant operating on battery power, it may be desirable to maximize power efficiency of power amplifier 130, while still providing some level of transmit pulse shaping to ensure that out-of-band transmissions of transmitter 190 are within acceptable or allowed levels.

2. Transmit Pulse Shaping Filter for PAR Reduction

In an embodiment, transmit pulse shaping filter 110 is implemented as a raised cosine filter.

As is well-known in the relevant arts, the impulse response h(t) of a raised cosine filter is specified by equation 1 below:

$$h(t)=[(\text{sinc}(t/T))(\cos(\alpha\pi t/T))/(1-((2\alpha t/T)^2)]\quad\text{Equation 1}$$

wherein,
sinc( ) represents the sinc function,
T represents the period of a symbol, and
α represents a roll-off factor of the raised cosine filter.

FIG. 3A represents graphically the impulse response h(t) for an example value of roll-off factor α. The impulse response has a value of zero for time instances equaling the symbol period T, as well as at multiples of the symbol period T. FIG. 3A shows only a truncated impulse response, truncated to symbol durations equal to three on either side of the point of symmetry at time instance equaling zero, i.e., the peak of the impulse response. Ideally, the impulse response of a raised cosine filter is infinitely long on either side of the peak. The term 'raised cosine filter' is used herein to refer to both raised cosine filters with truncated impulse responses (i.e., truncated raised cosine filters) as well as the (ideally) infinitely long raised cosine filter. With respect to FIG. 3A, the impulse response curve for other values of α, and for longer or shorter symbol lengths, would be correspondingly different.

FIG. 3B represents the frequency spectrum of a raised cosine pulse for three values of roll-off factor α. Response denoted by label 330 represents the frequency response for a value of α equal to 0. Response denoted by label 310 represents the frequency response for a value of α equal to 1. Response denoted by label 320 represents the frequency response for a value of α greater than zero and less than 1. In general, the frequency response of a raised cosine pulse varies based on the roll-off factor α. Mathematically, the magnitude portion H(ω) of the frequency response of a raised cosine pulse is specified by equation 2 below:

$$H(\omega) = T; \text{ for } 0 \leq \omega \leq \frac{\pi(1-\alpha)}{T} \quad\text{Equation 2}$$

$$H(\omega) = \frac{T}{2}\left(1 - \sin\left(\left(\frac{T}{2\alpha}\right)\left(\omega - \frac{\pi}{T}\right)\right)\right);$$

$$\text{for } \frac{\pi(1-\alpha)}{T} \leq \omega \leq \frac{\pi(1+\alpha)}{T}$$

$$H(\omega) = 0; \text{ for } \omega \geq \frac{\pi(1+\alpha)}{T}$$

wherein, sin( ) represents a sine function, and

ω represents frequency.

In an embodiment, transmit pulse shaping filter 110 is implemented as a raised cosine filter with a length of two symbols on either side of the peak (i.e., total of 4 symbols). Referring to FIG. 3A, the portion of the impulse response curve between time points t30 and t31 represents a filter length of two symbols on either side of the peak (at t=0). In transmit pulse shaping filter 110, implemented as a raised cosine filter in FIR form, the values of samples (digital values) of the portion of the impulse response between t30 and t31 represent the values of the FIR filter coefficients. The specific number of samples used to represent the portion between t30 and t31 may be implementation specific, and may be determined a priori in a known way. In an embodiment, a sampling rate of four times the symbol rate is used. Transmit pulse shaping filter 110 implemented as a raised cosine filter reduces PAR of signal 132.

In an embodiment, transmit pulse shaping filter 110, implemented as a raised cosine filter, is used in conjunction with π/2-shift BPSK modulation (implemented in constellation mapper 105). When π/2-shift BPSK modulation is used, phase transitions (of the π/2-shift BPSK modulated signal) are limited to ninety degrees (as against 180 degrees for normal BPSK). FIG. 4 shows an example constellation diagram used in π/2-shift BPSK. Constellation points 410, 420, 430 and 440 are assumed to respectively represent phases of 0 degrees, 90 degrees, 180 degree and 270 degrees. Assuming a symbol (e.g., a logic 0 bit) is represented by point 410, a change in the symbol (e.g., to a logic 1 bit) is represented by one of constellation points 420 and 440. A next change in the symbol value (e.g., from a logic one to a logic zero) may be represented by one of constellation points 410 and 430. Thus, the phase shift (of a carrier) used to represent a bit transition is 90 degrees, unlike a phase shift of 180 degrees in BPSK.

Due to the lower value of phase shift in π/2-shift BPSK modulation, the PAR of signal 132 is further reduced. Table 500 of FIG. 5 shows example PAR values of signal 132 for corresponding values of filter length (of transmit pulse shaping filter implemented as a raised cosine filter with roll-off factor of 0.5) and emissions in adjacent channels, in an embodiment of transmitter 190 designed to employ π/2-shift BPSK. It may be observed by comparison of the table entries of table 500 and those of table 250 of FIG. 2B that PAR values of signal 132 for comparable (or better) adjacent channel emissions are relatively smaller. For example, PAR corresponding to adjacent channel emission of −47.6 dB equals 0.95 dB for filter length of 3 symbol periods on either side of the peak response (i.e., a total of 6 symbol period length). Referring to table 250 of FIG. 2B for comparison, PAR corresponding to adjacent channel emission of −40.6 dB equals 2.1 dB for a filter length of 6 symbol periods.

Thus, the use of raised cosine filtering for pulse shaping, in combination with π/2-shift BPSK modulation, implemented in transmitter 190 reduces the PAR of signal 132. Therefore, power amplifier 130 may be implemented to have a relatively non-linear gain characteristic. Thus, power amplifier 130 may be implemented as a class B, class C or class D power amplifier, and therefore with greater power efficiency than otherwise (for example, a class A amplifier).

Complementary to the implementation of transmit pulse shaping filter 110 as a raised cosine filter, receive pulse shaping filter 175 of receiver 195 is implemented as a root-raised cosine filter (RRC filter). As is well-known in the relevant arts, a root-raised cosine filter is defined by a frequency response that is the square root of the frequency response of a raised cosine filter, and therefore equals $\sqrt{H(\omega)}$, wherein $\sqrt{}$ represents a square root operator, and H(ω) is as defined above in Equation 2. The specific impulse response (or frequency response) of an RRC filter is also determined by a corresponding roll-off factor, as is well-known in the relevant arts.

While, the use of a root-raised cosine filter in receiver 195 in conjunction with a raised cosine filter in transmitter 190 may not lend to reduction of ISI to zero in receiver 195, the RRC filter characteristics may be selected to minimize ISI, as well as implementation complexity. In an embodiment, receive pulse shaping filter 175 is implemented as an RRC filter of one-sided length of two symbol periods (i.e., a total of four symbol periods).

Figure 6A:
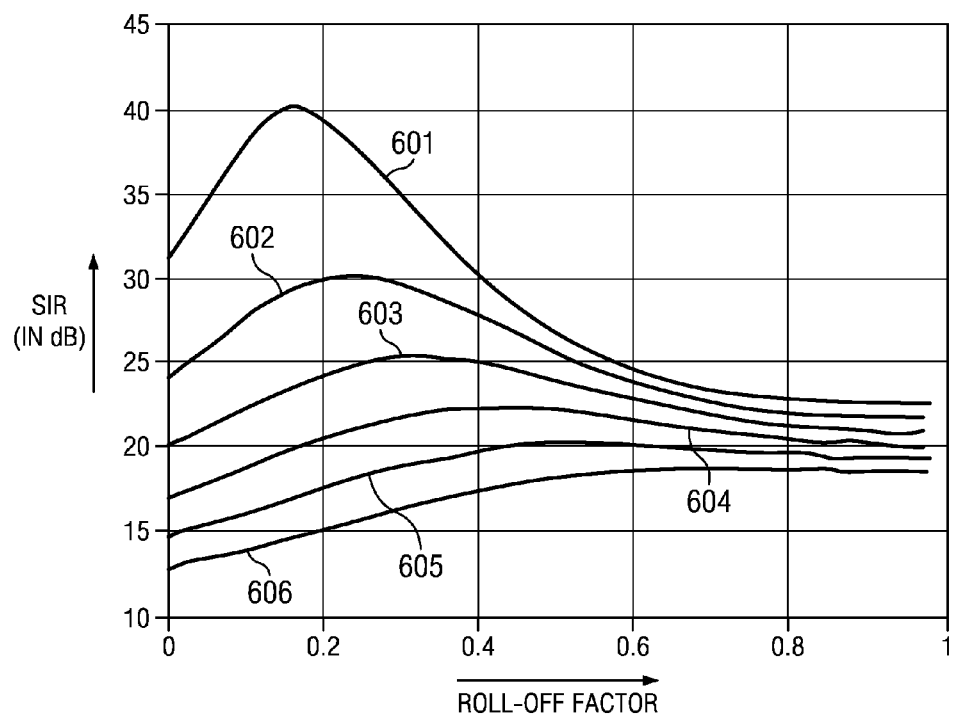
FIG. 6A is a diagram showing example variations of signal-to-interference ratio (SIR) with respect to roll-off factor of an RRC filter used in a receiver, in an embodiment.

A desired signal-to-interference ratio (SIR) may be obtained by using a suitable combination of roll-off factor and symbol rate parameter (1/T) for the RRC filter in receiver 195. FIG. 6A shows the variation of SIR in deciBels (dB) with respect to roll-off factor and six values of symbol rate parameter (1/T) of the RRC filter used in receiver 195. The symbol rate parameter (1/T) of the RRC filter corresponding to curves 606, 605, 604, 603, 602 and 601 shown in FIG. 6A respectively equal 200 Kilo Hertz (kHz), 210 kHz, 220 kHz, 230 kHz, 240 kHz and 250 kHz. The SIR curves of FIG. 6A correspond to a system symbol rate (i.e., the number of symbols per second transmitted by transmitter 190, and received by receiver 195) of 200 KHz. The symbol rate parameter (1/T) used in the RRC filter for other values of system symbol rates would be correspondingly scaled. For example, if a value of 240 kHz is used as the symbol rate parameter for the RRC filter for a system symbol rate of 200 KHz, then for a system symbol rate of 400 kHz, the value of the symbol rate parameter to be used would be 480 kHz.

Figure 6B:
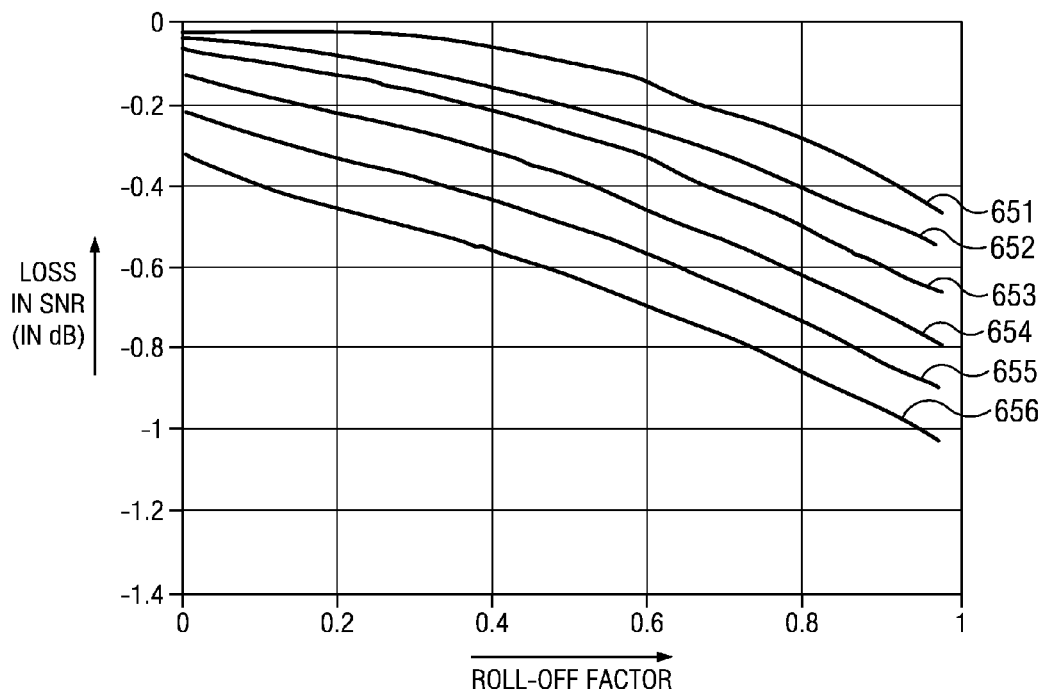
FIG. 6B shows the variation of loss in signal-to-noise ratio (SNR) with respect to roll-off factor of an RRC filter used in receiver, in an embodiment.

FIG. 6B shows the variation of loss in signal-to-noise ratio (SNR) in dB with respect to roll-off factor of the RRC filter and six values of symbol rate parameter (1/T) of the RRC filter used in receiver 195. The symbol rate parameter (1/T) of the RRC filter corresponding to curves 651, 652, 653, 654, 655 and 656 respectively equal 200 kHz, 210 kHz, 220 kHz, 230 kHz, 240 kHz and 250 kHz. The loss-in-SNR curves of FIG. 6B correspond to a system symbol rate of 200 kHz. The symbol rate parameter (1/T) used in the RRC filter for other values of system symbol rates would be correspondingly scaled, as also noted above.

In an embodiment, transmit pulse shaping filter 110 is implemented as a raised cosine filter with pulse length of 2 on either side of the peak response (i.e., a total of 4 symbol periods), and a roll-off factor α of 0.5, corresponding to a PAR of signal 132 of 0.76 dB and adjacent channel emissions below −36 dB (as also shown in row 2 of table 500). In the embodiment, receive pulse shaping filter 175 is implemented as a RRC filter with a roll-off factor of 0.2 and a symbol rate parameter (1/T) of 250 KHz. The corresponding value of ISI is −40 dB and SNR degradation is less than 0.5 dB. Transmit power back-off when using raised cosine transmit pulse shaping with pulse length of a total of 4 symbol periods and roll-off factor α of 5 is 0.76 dB due to PAR of 0.76 dB (as shown in row 510 of FIG. 5), and sensitivity degradation of receiver 195 is 0.5 dB. Transmit power back-off when using RRC transmit pulse shaping with pulse length of a total of 4 symbol periods and roll-off factor α of 5 is 1.9 dB due to PAR of 1.9 dB (as shown in row 260 of FIG. 2B). Hence, the path loss that can be tolerated to achieve the same performance improves by [1.9−(0.76+0.5)], i.e., 0.64 dB. Thus, overall link budget improvement is approximately 0.64 dB.

In another embodiment, transmit pulse shaping filter 110 is implemented as a raised cosine filter with pulse length pulse of 2 on either side of the peak response and a roll-off factor α of 0.5, and receive pulse shaping filter 175 is implemented as a RRC filter with a roll-off factor of 0, and symbol rate parameter (1/T) of 240 KHz. The corresponding value of ISI is −25 dB and SNR degradation is less than 0.2 dB. Overall link budget improves by approximately by 0.94 dB [(1.9−0.76)−0.2].

In general, when higher values of SIR are desired (as, for example, when using higher constellations), receive pulse shaping filter 175 may be implemented as a RRC filter with a roll-off factor of 0.2 and a symbol rate parameter (1/T) of 250 KHz. When relatively lower values of SIR are acceptable (as, for example, when using lower constellations), receive pulse shaping filter 175 is implemented as a RRC filter with a roll-off factor of 0, and symbol rate parameter (1/T) of 240 KHz, as such an approach provides better link budget improvement.

Transmit pulse shaping filter 110 and receive pulse shaping filter 175 may each be implemented using hardware components, by the execution of instructions in a processor, or a combination of the two.

In the illustration of FIG. 1, although terminals/nodes are shown with direct connections to various other terminals, it should be appreciated that additional components (as suited for the specific environment) may also be present in the path, and accordingly the connections may be viewed as being electrically coupled to the same connected terminals.

While various embodiments of the present disclosure have been described above, it should be understood that they have been presented by way of example only, and not limitation. Thus, the breadth and scope of the present disclosure should not be limited by any of the above-described embodiments, but should be defined only in accordance with the following claims and their equivalents.

What is claimed is:

1. A communication system comprising:
   a transmitter to generate and transmit a signal carrying a plurality of symbol values representing corresponding data sets, wherein each symbol value in the plurality of symbol values is pulse-shaped in the transmitter using raised cosine filtering; and
   a receiver to receive and demodulate the signal to extract the corresponding data sets, wherein the receiver employs root-raised cosine filtering in demodulating the signal,
   wherein a mapping between the corresponding data sets and symbol values in the plurality of symbol values is according to π/2-shift binary phase-shift keying (π/2 BPSK).

2. The communication system of claim 1, wherein a root-raised cosine filter used to perform the root-raised cosine filtering in the receiver is implemented to have an impulse response length of four symbol periods, a roll-off factor of 0.2 and a symbol rate parameter (1/T) of 250 KHz.

3. The communication system of claim 1, wherein a root-raised cosine filter used to perform the root-raised cosine filtering in the receiver is implemented to have an impulse response length of four symbol periods, a roll-off factor of 0 and a symbol rate parameter (1/T) of 240 KHz.

4. The communication system of claim 1, wherein the raised cosine filtering in the transmitter is implemented to have an impulse response length of four symbol periods, and a roll-off factor (α) of 0.5.

5. The communication system of claim 1, wherein the raised cosine filtering has a length of four symbol periods.

6. The communication system of claim 1, wherein a power amplifier coupled to the transmitter is implemented to have non-linear gain characteristics as the peak-to-average power ratio of the signal is reduced due to the interaction of the π/2 BPSK and the raised cosine filtering, thereby enabling the power amplifier to have higher power efficiency than without the non-linear gain characteristics.

7. A receiver comprising:
   an antenna to receive, via a communications channel, a signal transmitted by a transmitter, wherein the signal carries a plurality of pulse-shaped symbol values, wherein each pulse-shaped symbol value in the plurality of pulse-shaped symbol values is obtained by raised cosine filtering of symbol values representing corresponding data sets, the antenna to provide the signal as an output;
   a receive pulse shaping filter coupled to receive digital values representing a down-converted signal obtained from the signal, the receive pulse shaping filter to filter the digital values to generate a baseband signal, wherein the receive pulse shaping filter is a root-raised cosine filter; and
   a baseband processor to obtain the corresponding data sets by demodulating the baseband signal,
   wherein the signal transmitted by the transmitter is a π/2-shift binary phase-shift keyed signal.

8. The receiver of claim 7, wherein the receive pulse shaping filter is implemented to have a roll-off factor of 0.2, and a symbol rate parameter (1/T) of 250 KHz.

9. The receiver of claim 7, wherein the receive pulse shaping filter is implemented to have a roll-off factor of 0, and a symbol rate parameter (1/T) of 240 KHz.

10. The receiver of claim 8, further comprising:
    a low-noise amplifier (LNA) coupled to receive the output of the antenna, and to generate an amplified signal;
    a down-converter coupled to receive the amplified signal and to generate the down-converted signal; and
    an analog-to-digital converter (ADC) coupled to receive the down-converted signal, and to generate the digital values representing the down-converted signal.

11. The receiver of claim 10, wherein the communications channel is a wireless medium.

12. The receiver of claim 7, wherein the wherein the signal transmitted by the transmitter has non-linear gain characteristics due to the interaction of the π/2 BPSK and the raised cosine filter, thereby enabling the received signal to have higher power efficiency than without the non-linear gain characteristics.

13. The receiver of claim 7, wherein the receive pulse shaping filter is implemented to have an impulse response length of four symbol periods, a roll-off factor of 0.2.

14. The receiver of claim 7, wherein the raised cosine filter has a length of four symbol periods.

* * * * *